Patented Dec. 11, 1923.

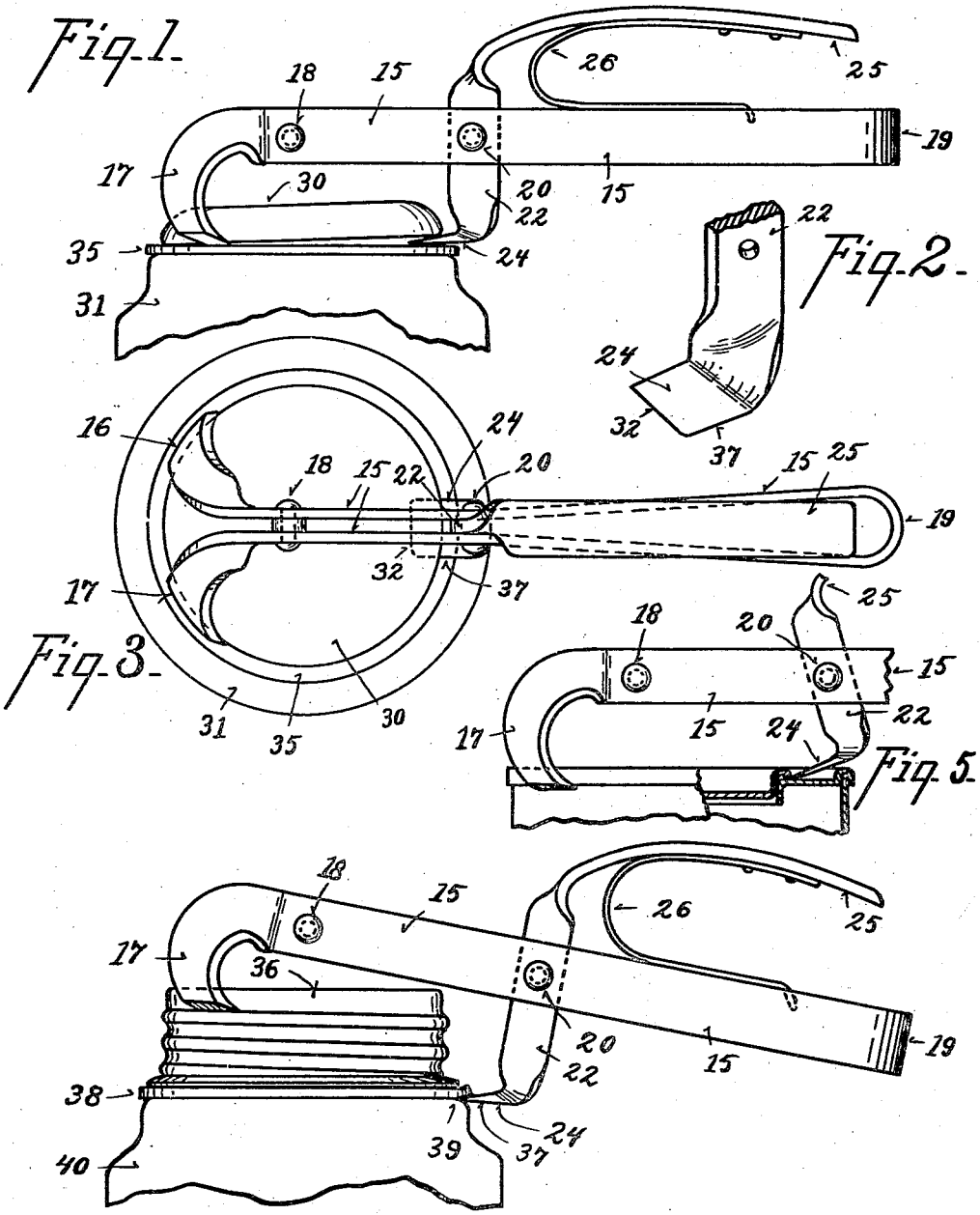

1,476,707

UNITED STATES PATENT OFFICE.

WALTER J. GALLAGHER, OF CINCINNATI, OHIO.

JAR OPENER.

Application filed March 15, 1922. Serial No. 544,048.

*To all whom it may concern:*

Be it known that I, WALTER J. GALLAGHER, a citizen of the United States, residing at Cincinnati, in the county of Hamilton and State of Ohio, have invented certain new and useful Improvements in Jar Openers, of which the following is a specification.

My invention relates to improvements in opener for fruit jars and similar containers. One of its objects is to provide an improved simple and reliable implement to open fruit jars and similar containers. Another object is to provide an improved article of manufacture applicable to a variety of operations such as the opening of a variety of different fruit jars and containers. My invention also relates to certain details of form, combination and arrangement all of which will be fully set forth in the description of the accompanying drawings, in which:

Fig. 1, is a side elevation of my improved implement or article of maufacture applied to the opening of one type of fruit jar.

Fig. 2, is a detail perspective of one claw portion of my improved article.

Fig. 3, is a plan view of Fig. 1.

Fig. 4, is a view similar to Fig. 1, illustrating the application of my improved article to the opening of a fruit jar of another type.

Fig. 5, is a view similar to Fig. 4, illustrating the application of my improved article to the opening of a sheet metal container of another type.

The accompanying drawings illustrate the preferred embodiment of my invention in which 15 represents a loop-shaped member preferably formed by bending a rod of metal of rectangular cross section upon itself into a loop and forming its opposite ends into a pair of claws 16 and 17 which preferably diverge and are fitted to engage a portion of the circumference of a fruit jar or jar lid or similar container. The looped portions of the member 15 are preferably connected together close to the base of the claws 16 and 17 by means of a bolt or rivet 18, and also at another point closer to the loop 19 by another bolt or rivet 20 which also serves as a pivotal bearing for a clamping or claw member 22 having a sharp blade or claw 24 at one end opposite the claws 16 and 17 and a handle 25 at its opposite end. The handle 25 is bent or curved over so as to approach a position parallel to the loop end of the member 15 to enable the loop of the member 15 and the handle 25 to be grasped by one hand when in use. A spring 26 attached at one end to the handle 25 and with its other end bearing upon the member 15 tends to hold said handles 15 and 25 normally apart.

The divergent claws 16 and 17 in connection with the movable claw 24 provide for a three point engagement of the claws with a jar or jar cover in such relation as to prevent slippage of the claws from engagement with the jar or lid, and at the same time facilitates a rotary movement of all the claws together relative to the jar or jar lid where such movement is desirable. My improved implement is therefore applicable to a variety of uses in the opening of a variety of containers. For instance as shown in Figs. 1 and 3, the opener is shown applied to lifting the glass lid 30 of a fruit jar 31 of the "Easy Seal" type, which is effected by engaging one edge of the lid by the divergent jaws 16 and 17 and then by actuating the handle 25 inserting the sharp front edge 32 of the claw 24 either above or beneath the rubber jar ring 35 so as to use either the claws 16 and 17 or the claw 24 as the fulcrum of a lever to lift the lid 30 from the jar 31.

In Fig. 4 I have illustrated the application of my improved implement to the opening of a fruit jar of the "Mason screw top" type, in which the claws 16 and 17 are allowed to engage one side of the screw top or lid 36 while the claw 24 which is also provided with a sharp side edge 37 is inserted either beneath the edge of the lid 36 and between the lid and the rubber jar ring 38, or between the jar ring 38 and the shoulder 39 of the jar 40, and the implement then moved rotatably about the jar and jar lid so that the sharp edge 37 of the claw 24 will progressively loosen the jar ring 38 either from the lid or from the jar entirely around the jar, whereupon the lid may be readily unscrewed by hand.

In Fig. 5, I have illustrated the application of my improved implement to disengaging the lid 41 from a sheet metal container 42 which may be effected by engaging the claws 16 and 17 upon one side of the container near the top thereof while the claw 24 is inserted beneath the flange 43 of the lid 41 and employed as the movable end of a lever to lift the lid 41 from its engagement with the container. Where lids similar to the one shown in Fig. 5, but of greater diameter are to be lifted the claws 16 and 17 may rest upon the top of the container or even on top of one edge of the lid while the claw 24 is inserted as shown in Fig. 5, beneath the opposite edge of the lid and employed as a lever to lift the lid.

The article of manufacture herein shown and described is capable of considerable modification without departing from the spirit of my invention.

What I claim is:

1. An article of manufacture comprising a first member having a pair of divergent downwardly directed claws at one end to engage one fraction of the exterior of a curved article and provided at its opposite end with a handle, and a second member pivotally connected to said first member at substantially the middle portion thereof and having a downwardly directed claw at one end to engage an opposite fraction of the exterior of said curved article to engage a jar rubber to break the seal and a handle located above the handle of said first member and adapted to be grasped simultaneously with and forced toward the hand'e of said first member to force said claws toward each other.

2. An article of manufacture comprising a first member having a pair of divergent downwardly and inwardly directed claws at one end to engage and travel circumferentially over the curved exterior of a container to be opened and provided at its opposite end with a handle, and a second member pivotally connected to said first member at an intermediate point and having a downwardly and inwardly directed claw at one end to engage and travel circumferentially relative to the opposite portion of the curved exterior of said container and a handle located above the handle of said first member and adapted to be grasped simultaneously with and forced toward the handle of said first member to force said claws toward each other to engage the jar rubber to break the seal.

3. As an article of manufacture a jar opener comprising a member having a claw at one end to engage at a plurality of points along an extended fraction of the curved surface of a container and provided at its opposite end with a handle, and a second member pivotally connected to said first member at an intermediate point and provided with a downwardly and inwardly directed claw having a sharp edge opposite said first claw and with a handle at its opposite end located above the handle of said first member and adapted to be forced toward the handle of said first member to force said claws toward each other to engage a jar rubber to break the seal.

4. As an article of manufacture a jar opener comprising a member having a downwardly and inwardly directed claw at one end adapted to engage at a p'urality of points along an extended fraction of the curved surface of a container and provided at its opposite end with a handle, and a second member pivotally connected to said first member at an intermediate point and provided at one end with a downwardly and inwardly directed claw having a frontal and a lateral sharpened edge in a plane substantially parallel with said first hand'e and at its opposite end with a handle located above the handle of said first member and adapted to be simultaneously grasped with and forced toward the handle of said first member to force said claws toward each other.

In testimony whereof I have affixed my signature.

WALTER J. GALLAGHER.